United States Patent
Niessner et al.

(10) Patent No.: US 10,858,510 B2
(45) Date of Patent: Dec. 8, 2020

(54) TRANSPARENT GRAFT COPOLYMERS BASED ON ACRYLATE SOFT PHASES

(71) Applicant: INEOS STYROLUTION GROUP GMBH, Frankfurt am Main (DE)

(72) Inventors: Norbert Niessner, Friedelsheim (BE); Tobias Schulz, Cologne (DE); Oliver Carstensen, Frankfurt (DE); Konrad Knoll, Mannheim (BE); Manfred Doering, Woerth (BE); Frank Schoenberger, Bensheim (DE); Julien Fage, Karlsruhe (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 9 days.

(21) Appl. No.: 16/325,446

(22) PCT Filed: Aug. 9, 2017

(86) PCT No.: PCT/EP2017/070168
§ 371 (c)(1),
(2) Date: Feb. 14, 2019

(87) PCT Pub. No.: WO2018/033444
PCT Pub. Date: Feb. 22, 2018

(65) Prior Publication Data
US 2020/0010663 A1    Jan. 9, 2020

(30) Foreign Application Priority Data
Aug. 17, 2016 (EP) ..................... 16184509

(51) Int. Cl.
| | | |
|---|---|---|
| C08L 51/00 | (2006.01) | |
| C08F 2/00 | (2006.01) | |
| C08F 2/22 | (2006.01) | |
| C08F 220/14 | (2006.01) | |
| C08F 236/20 | (2006.01) | |
| C08F 265/06 | (2006.01) | |
| C08F 236/04 | (2006.01) | |
| C08L 25/12 | (2006.01) | |
| C08F 220/18 | (2006.01) | |

(52) U.S. Cl.
CPC ............ C08L 51/003 (2013.01); C08F 2/001 (2013.01); C08F 2/22 (2013.01); C08F 220/14 (2013.01); C08F 236/04 (2013.01); C08F 236/20 (2013.01); C08F 265/06 (2013.01); C08L 25/12 (2013.01); C08F 220/1804 (2020.02); C08F 220/1806 (2020.02); C08F 2438/03 (2013.01); C08L 2201/10 (2013.01); C08L 2203/20 (2013.01)

(58) Field of Classification Search
CPC ..... C08F 265/04; C08F 236/20; C08F 212/08
See application file for complete search history.

(56) References Cited

U.S. PATENT DOCUMENTS

| | | | |
|---|---|---|---|
| 3,793,402 A | | 2/1974 | Owens |
| 5,869,590 A | * | 2/1999 | Clark ...................... C09D 4/00 524/533 |
| 6,323,279 B1 | | 11/2001 | Guntherberg et al. |
| 2018/0066117 A1 | | 3/2018 | Banaszak et al. |

FOREIGN PATENT DOCUMENTS

| | | |
|---|---|---|
| CN | 103254374 A | 8/2013 |
| EP | 0306894 A2 | 3/1989 |
| EP | 0993476 B1 | 2/2002 |
| GB | 1472195 A | 5/1977 |
| WO | 2012/140042 A1 | 10/2012 |
| WO | 2016/150999 A1 | 9/2016 |

OTHER PUBLICATIONS

Niessner et al., "Polystyrenes and Styrene Copolymers—An Overview," in "Modem Styrenic Polymers: Polystyrenes and Styrenic Copolymers," Eds. J. Scheirs, Priddy, Wiley, Chichester, UK, 2003, pp. 25-42.

* cited by examiner

Primary Examiner — Jeffrey C Mullis
(74) Attorney, Agent, or Firm — J.A. Lindeman & Co. PLLC

(57) ABSTRACT

The invention relates to graft copolymers—based on non-cross-linked acrylate soft phases from which styrenic monomers are grafted—with a defined micro-structure, having a high transparency, toughness and weather resistance (UV-stability), a process for their preparation and their use, and also to polymer blends comprising said graft copolymers and styrenic polymers, and shaped articles produced therefrom and their use.

19 Claims, No Drawings

TRANSPARENT GRAFT COPOLYMERS BASED ON ACRYLATE SOFT PHASES

The invention relates to graft copolymers—based on non-cross-linked acrylate soft phases—with a defined micro-structure, having a high transparency, toughness and weather resistance (UV-stability), a process for their preparation and their use. The invention further relates to molding compositions comprising said graft copolymers and their use.

Currently available transparent and tough materials comprising a blend of a hard matrix (co-) polymer (e.g. GPPS, SAN, SMMA) and an impact modifier (e.g. ASA) require a refractive index matching between said two components. Further currently available transparent and tough materials are specialty polymers such as styrene-butadiene block co-polymers (SBC) which combine the toughness of HIPS with the transparency of GPPS but require an anionic polymerization method to allow the production of exactly defined molecular structures.

Document CN-A 103254374 discloses a tough transparent linear polystyrene-b-poly-n-butylacrylate-b-polystyrene triblockcopolymer comprising a poly-n-butylacrylate soft block and styrene (co-)polymer hard blocks. The block copolymers are obtained by using a controlled emulsion polymerization (reversible addition-fragmentation chain transfer free radical polymerization technology) in presence of amphiphilic molecules as reversible addition-fragmentation chain transfer agents.

Patent application PCT/EP2016/056344 deals with a process for the preparation of cross-linked ABS or ASA graft copolymers having a core/shell-morphology and their use as impact modifiers in blends with styrenic polymers. The cross-linked graft base is obtained by polymerization of an alkyl acrylate or a diene in presence of low amounts (at most 0.75 wt.-%) of a chain transfer agent (relative to monomer content of graft base). Acrylate graft bases further contain at most 10 wt.-% of a polyfunctional cross-linking monomer. The graft sheath content is in particular preferably from 20 to 50 wt.-%. All examples deal with cross-linked ABS graft copolymers. Transparent materials or even transparent ASA graft copolymers are not mentioned.

It is one object of the invention to provide transparent, tough and weather resistant, especially UV-resistant, polymers and a process for their preparation that is simple to carry out on an industrial scale and which does not require any special polymerization techniques such as controlled radical or ionic polymerization methods. A further object of the invention is to provide transparent, tough and weather resistant molding compositions comprising said polymer and a hard matrix thermoplastic polymer with no need for a refractive index matching of said polymer components.

Subject of the invention is a graft copolymer B, built up from:
- (B1) 15 to 45 wt.-%, preferably 20 to 40 wt.-%, based on graft copolymer B, of a non-cross-linked graft substrate polymer B1 having a glass transition temperature $T_G$ below 25° C. (DSC, heating rate: 5 K/min), consisting of polymerized units derived from monomers B11, B12 and optionally B13:
  - (B11) from 95 to 99.5 wt.-%, based on the total weight of B11, B12 and B13, of at least one $C_1$-$C_{10}$-alkyl acrylate;
  - (B12) from 0.5 to 5 wt.-%, based on the total weight of B11, B12 and B13, of at least one bifunctional, crosslinking monomer which contains two copolymerizable double bonds which are not conjugated in 1,3 positions; and
  - (B13) from 0 to 4.5 wt.-%, based on the total weight of B11, B12 and B13, of at least one other copolymerizable, monoethylenically unsaturated monomer; and
- (B2) 55 to 85 wt.-%, preferably 60 to 80 wt.-%, based on graft copolymer B, of at least one polymer B2 having a glass transition temperature $T_G$ above 25° C., grafted (in the form of branches) from the graft substrate polymer (B1), consisting of polymerized units derived from monomers B21 and optional comonomers B22:
  - (B21) from 65 to 100 wt.-% of at least one vinylaromatic monomer and/or of at least one $C_1$-$C_8$-alkyl-(meth)acrylate, preferably of at least one vinylaromatic monomer or its mixture with at least one $C_1$-$C_8$-alkyl-(meth)acrylate; and
  - (B22) from 0 to 35 wt.-% of at least one other monofunctional comonomer;

where components B1 and B2 give 100 wt.-% in total, and wherein the graft substrate polymer B1 has a gel content (non-soluble fraction in toluene) below 5 wt.-%, preferably below 3 wt.-%, more preferably below 1 wt.-%, based on the total amount of B1; and the second double bond of the bifunctional, crosslinking monomer B12 is the active site from which polymerized units derived from monomer B21 and optionally comonomer B22 are grafted.

Wt.-% means % by weight. The amounts of components B11, B12 and B13 give 100 wt.-% in total.

The glass transition temperature Tg is determined by DSC based on DIN EN ISO 11357-2:2014-07 (heating rate: 5 K/min).

Graft Copolymer B

The graft copolymers B according to the invention are highly transparent having generally a transmittance of at least 75% and a haze coefficient below 10%, preferably below 5%. The transmission is determined according to ASTM D1003 and the haze is determined according to ASTM D1003-95.

The term "non-cross-linked graft substrate polymer B1" as used hereinbefore means that the gel content (non-soluble fraction from the isolated polymer B1, solvent: toluene) of the graft substrate polymer B1 is below 5 wt.-%, based on the total amount of B1.

The second double bond and active site of the bifunctional, crosslinking monomer B12 is a non-(meth)acrylic double bond in case monomer B12 is a monomer—other than di(meth)acrylates—which has only one (meth)acrylic double bond (e.g. AMA and DCPA).

The graft copolymer B comprises or consists of a soft phase and a hard phase. The non-cross-linked graft substrate polymer B1 (=backbone polymer) constitutes the soft phase and provides elasticity for high elongation and impact resistance of the material. Polymer B2 constitutes the hard phase and is responsible for the material toughness, necessary for the high mechanical strength.

Moreover, the graft copolymers B have a specific, preferably lamellar, micro-structure in difference to the common core/shell-morphology of the impact modifier particles of ASA-graft copolymers according to the prior art. To ensure excellent transparency of the graft copolymer B, the domain size of the graft copolymer B is below the wave-length of visible light. Due to incompatibility of the different phases graft copolymer B shows a microphase separation, this results in a periodic nanostructure, where the distance of the different phases is below the wavelength of visible light (similar to a lattice constant).

Preferably the number average molar mass $M_n$ (measured by SEC analysis, see experimental part) of the graft substrate polymer B1 is in the range of from 20.000 to 50.000 g/mol, more preferably 20.000 to 40.000 g/mol.

The grafted polymerized units derived from monomer B21 and optionally comonomer B22 constituting polymer B2 (=hard phase) form, preferably linear, branches which branches may have the same or preferably a different length. Graft copolymers B having an unsymmetrical architecture are often preferred. The short branches of such preferred unsymmetrical graft copolymers B ensure compatibility in blends with a different polymer A, in particular a hard phase matrix polymer, and the long branch(es) provide high mechanical strength.

The graft copolymers B according to the invention can be used on its own, optionally in combination with additives and/or auxiliaries C, as a high performance polymer (high impact resistance and transparency) or as a blend with one or more further polymers A.

Further subject of the invention are molding compositions comprising graft copolymer B and optionally additives and/or auxiliaries C. Preferred molding compositions comprise graft copolymer B and additives and/or auxiliaries C. Said additives and/or auxiliaries C are commonly known in the art.

Said molding compositions can further comprise at least one thermoplastic polymer A.

The amount of said additives and/or auxiliaries C is generally 0 to 10 wt.-%, preferably 0.1 to 5 wt.-%, more preferably 0.2 to 2 wt.-%, based on the overall molding composition comprising (consisting of) components B and C, and optionally component A. If additives and/or auxiliaries C are present in said composition, their minimum fraction is customarily 0.1 wt %.

The sum of the components B and C, and optionally component A, makes 100 wt %.

For the preparation of the inventive molding composition said additives and/or auxiliaries C can be mixed with graft copolymer B or polymer A alone, or can be added to their mixture.

Graft substrate polymer B1 The graft substrate polymer B1 has a glass transition temperature $T_G$ below 25° C. (DSC, heating rate: 5 K/min), preferably below 0° C., most preferably below −25° C.

According to the invention the graft substrate polymer B1 consists of polymerized units derived from monomers B11, B12 and optionally B13:

(B11) from 95 to 99.5 wt.-%, preferably 96 to 99 wt.-%, more preferably 97 to 98.5 wt.-% based on the total weight of B11, B12 and B13, of at least one $C_1$-$C_{10}$-alkylacrylate;

(B12) from 0.5 to 5% wt.-%, preferably 1 to 4 wt.-%, more preferably 1.5 to 3 wt.-% based on the total weight of B11, B12 and B13, of at least one bifunctional, crosslinking monomer which contains two copolymerizable double bonds which are not conjugated in 1,3 positions; and (B13) from 0 to 4.5 wt.-%, preferably 0 to 3 wt.-%, more preferably 0 to 1.5 wt.-% based on the total weight of B11, B12 and B13, of at least one other copolymerizable, monoethylenically unsaturated monomer.

The amounts of monomers B11, B12 and B13 give 100 wt.-% in total.

Particularly suitable $C_1$-$C_{10}$-alkyl acrylates (B11) are methyl acrylate, ethyl acrylate, propyl acrylate, n-butyl acrylate, n-pentyl acrylate, n-hexyl acrylate, n-heptyl acrylate, n-octyl acrylate, 2-ethyl-hexyl acrylate, n-nonyl acrylate and n-decyl acrylate, and also mixtures of these, particularly preferably ethyl acrylate, 2-ethylhexyl acrylate, n-butyl acrylate or mixtures of these, and very particularly preferably n-butyl acrylate.

Examples of copolymerizable, bifunctional crosslinking monomers (B12) suitable for crosslinking are ethylene glycol diacrylate, polyethylene glycol diacrylate, ethylene glycol dimethacrylate, butanediol diacrylate, butane-diol dimethacrylate, hexanediol diacrylate, hexanediol dimethacrylate, divinylbenzene, diallyl maleate, diallyl fumarate, diallyl phthalate, tricyclodecenyl acrylate, dihydrodicyclopentadienyl acrylate, allyl acrylate, allyl methacrylate (AMA) and dicyclo-pentadienyl acrylate (DCPA), preferably AMA and DCPA.

Other examples which may be mentioned of copolymerizable, monoethylenically unsaturated monomers (B13) are butadiene, isoprene; vinylaromatic monomers, such as styrene or α-methyl styrene; methacrylonitrile, acrylonitrile; acrylic acid, methacrylic acid, dicarboxylic acids, such as maleic acid and fumaric acid, and also anhydrides of these, such as maleic anhydride; nitrogen-functional monomers, such as dimethylaminomethyl acrylate, dimethylaminoethyl acrylate, vinylimidazole, vinylpyrrolidine, vinylcaprolactam, vinylcarbazole, vinylaniline, acrylamide; $C_1$-$C_4$-alkyl methacrylates, such as methyl methacrylate, ethyl methacrylate, n-propyl methacrylate, isopropyl methacrylate, n-butyl methacrylate, isobutyl methacrylate and sec-butyl methacrylate; aromatic or araliphatic(meth)acrylates, such as phenyl acrylate, phenyl methacrylate, 2-phenylethyl acrylate, 2-phenylethyl methacrylate, benzyl methacrylate, benzyl acrylate, 2-phenoxyethyl methacrylate and 2-phenoxyethyl acrylate; unsaturated ethers, such as vinyl methyl ether, and also mixtures of these monomers.

Preferred monomers (B13) are styrene and/or α-methyl styrene.

Preferably optional monomer B13 is not present.

The graft substrate polymer B1 contains a small amount of copolymerizable, bifunctional crosslinking monomer (B12) that acts as active site (binding site) for the graft copolymerization. The bifunctional co-monomer is selected to have one double bond reacting during the synthesis of the backbone and one double bond reacting during the grafting polymerization. In order to ensure phase compatibility the graft substrate polymer B1 is grafted from without further modification.

Polymer B2

Polymer B2 has a glass transition temperature $T_G$ above 25° C., preferably above 50° C., most preferably above 100° C. Polymer B2 consists of polymerized units derived from monomers B21 and optional comonomers B22:

(B21) from 65 to 100 wt.-%, often 65 to 85 wt.-%, of at least one vinylaromatic monomer and/or of at least one $C_1$-$C_8$-alkyl-(meth)acrylate, preferably of at least one vinylaromatic monomer or its mixture with at least one $C_1$-$C_8$-alkyl-(meth)acrylate; and (B22) from 0 to 35 wt.-%, often 15 to 35 wt.-%, of at least one monofunctional comonomer B22.

The amounts of monomers B21 and B22 give 100 wt.-% in total.

The vinylaromatic monomer (B21) is preferably styrene, α-methyl-styrene or ring-$C_1$-$C_8$-alkyl-alkylated styrenes, such as p-methylstyrene or tert-butylstyrene, particularly preferably styrene or α-methylstyrene, most preferably styrene.

According to the invention, the $C_1$-$C_8$-alkyl(meth)acrylates (B21) preferably used are methyl methacrylate (MMA), ethyl methacrylate, n- or isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methacrylate or 2-ethylhexyl methacrylate, particularly preferably methyl methacrylate, or mixtures of these monomers, methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate or 2-ethylhexyl acrylate, particularly preferably n-butyl acrylate, or else a mixture of these monomers with one another or preferably with the afore-mentioned methacrylates, where the amount of the acrylates in the graft shell is preferably subordinate.

Preferably used as monomer (B21) are styrene, α-methylstyrene and/or methyl methacrylate, more preferably styrene, α-methylstyrene, or a mixture of styrene or α-methylstyrene with methyl methacrylate.

In case component (B21) is a mixture of at least one, preferably one, vinylaromatic monomer and of at least one, preferably one, $C_1$-$C_8$-alkyl-(meth)acrylate monomer, said mixture preferably consists of 65 to 85 wt.-% vinylaromatic monomer B21, in particular styrene or α-methylstyrene, and 15 to 35 wt.-% $C_1$-$C_8$-alkyl-(meth)acrylate monomer, in particular methyl methacrylate.

Possible monofunctional comonomers (B22) are monomers selected from the group consisting of methacrylonitrile, acrylonitrile, N—$C_1$-$C_8$-alkyl-, N—$C_5$-$C_8$-cycloalkyl- and N—$C_6$-$C_{10}$-aryl-substituted maleimides, such as N-methyl-, N-phenyl-, N-dimethylphenyl- and N-cyclohexylmaleimide, and maleic anhydride. Maleic anhydride and in particular acrylonitrile are preferred.

It is preferable for polymer B2 to have been built up from styrene, or from a mixture consisting of 65 to 85 wt.-% styrene and 15 to 35 wt.-% acrylonitrile, maleic anhydride or methyl methacrylate, in particular acrylonitrile.

Process for the Preparation of Graft Copolymer B

A further subject of the invention is a process for the preparation of graft copolymer B as described above, which comprises (consists essentially of) the following steps:
(i) free radical aqueous emulsion polymerization of monomers B11, B12 and optionally B13 in presence of an initiator PI-1; and
(ii) grafting monomer B21 and optional comonomer B22 from graft substrate polymer B1 obtained in step (i) by free radical emulsion or solution polymerization in presence of an initiator PI-2;
where the initiators PI-1 and PI-2 can be the same or different compounds, and wherein
step i) is performed in presence of 0.85 to 2 wt.-%, preferably 0.90 to 2.0 wt.-%, more preferably 0.95 to 1.80 wt.-%, most preferably 0.95 to 1.60 wt.-%, of at least one chain transfer agent, based on the total amount of monomers B11, B12 and B13; and
in step ii)
the amount of the initiator PI-2 used is 0.1 to 3 wt.-%, preferably 0.5 to 2 wt. %, relative to the total content of monomers B21 and B22; and
monomer B21 and, if present, comonomer B22 are fed continuously to the reaction mixture within 7 to 20 hours, preferably 8 to 18 hours, more preferably 9 to 15 hours at a temperature of from 50 to 100° C.

In said process monomers B11, B12, B13, B21 and B22 and their amounts are the same as hereinbefore defined for graft copolymer B.

In step (i) of the process of the invention, the graft substrate polymer B1 is prepared, by polymerizing the monomers B11, B12 and optionally B13, in an aqueous emulsion, in presence of an initiator PI-1 at a temperature range from 20 to 100° C., preferably from 50 to 80° C., more preferably 50 to 65° C. Use may be made of the usual emulsifiers and initiators for emulsion polymerization.

Usual emulsifiers are such as alkali metal alkyl-or alkylarylsulfonates, alkyl sulfates, fatty alcohol sulfonates, salts of higher fatty acids having from 10 to 30 carbon atoms, sulfosuccinates, ether sulfonates, or resin soaps. Preference is given to the use of the sodium or potassium alkylsulfonates, or of salts of fatty acids having from 10 to 18 carbon atoms.

The usual amounts of emulsifiers may be used. Advantageous amounts of emulsifiers are from 0.3 to 5% by weight, in particular from 1 to 2% by weight, based on the monomers used in preparing the graft substrate polymer B1.

The latex of graft substrate polymer B1 is preferably prepared using sufficient water to give the finished latex a solid content of from 20 to 50% by weight.

Preferred polymerization initiators (PI) are free-radical generators, for example peroxides, preferably peroxosulfates, such as potassium peroxodisulfate, and azo compounds, such as azodiisobutyronitrile. However, it is also possible to use redox systems, in particular those based on hydroperoxides, such as cumene hydroperoxide. Said polymerization initiators (PI) can be used independently as polymerization initiator PI-1 in step (i) or as polymerization initiator PI-2 in step (ii) of the inventive process.

The amount of the polymerization initiator(s) PI-1 used in step (i) is usually from 0.1 to 1% by weight, based on the content of the monomers used in preparing the graft substrate polymer B1.

It is essential for the process according to the invention that the emulsion polymerization in step (i) is performed in presence of at least one, preferably one, chain transfer agent, such as ethylhexyl thioglycolate, tert-dodecyl mercaptan, terpinols or dimeric α-methylstyrene, in an amount of 0.85 to 2 wt.-%, preferably 0.90 to 2.0 wt.-%, more preferably 0.95 to 1.80 wt.-%, most preferably 0.95 to 1.60 wt.-%, based on the total amount of monomers B11, B12 and B13. The use of tert-dodecyl mercaptan (TDM) is in particular preferred.

The chain transfer agent in step i) is preferably added stepwise in two or more portions, preferably 2 to 5 portions, more preferably 3 portions. It is further preferred that said portions are equal portions, based on the total amount of the chain transfer agent. It is furthermore preferred, that in step i) the chain transfer agent is added stepwise in two or more portions, preferably 2 to 5 portions, more preferably 3 portions within 2 to 5 hours, in particular 3 to 4 hours.

To maintain a constant pH, preferably from 6 to 9, buffer substances may be used as polymerization auxiliaries, for example $Na_2HPO_4$/$NaH_2PO_4$, sodium hydrogencarbonate or sodium carbonate. The usual amounts of the buffer substances are used, and further details in this connection are therefore unnecessary.

The precise polymerization conditions, in particular the type, method of addition and amount of the emulsifier, are generally determined individually within the ranges given above in such a way as to give the non-cross-linked graft substrate polymer B1 with a gel content (non-soluble fraction in toluene) below 5 wt.-%, preferably below 3 wt.-%, more preferably below 1 wt.-%, based on the total amount of B1.

It is also in principle possible to prepare the graft substrate polymer B1 by a process other than emulsion polymerization, e.g. by bulk (mass) or solution polymerization, and then to emulsify the resultant polymers. The latter step is only one option. Usually in case of a solution polymerization, all steps (preparation and chemically modification of the graft substrate polymer and its grafting) are performed in solution. Microsuspension polymerization is also suitable, preferably using oil-soluble initiators, such as lauroyl peroxide or tert-butyl perpivalate. The processes for this are known.

Graft polymerization step (ii) of the process of the invention, can be conducted by emulsion or solution polymerization, preferably in aqueous emulsion in the presence of an aqueous emulsion of the graft substrate polymer B1. In the latter case the graft co-polymerization can be carried out in a system which is the same as that used for the polymerization of the graft substrate polymer B1 with addition of further initiator (=initiator PI-2) and, if required, of further emulsifier. These do not have to be the same as the emulsifiers or initiators used for preparing the graft substrate polymer B1. Preferably water soluble initiators such as peroxosulfates, in particular potassium peroxodisulfate, are used as initiator PI-2.

According to the invention the amount of the initiator PI-2 used in process step (ii) is usually from 0.1 to 3 wt.-%, preferably 0.5 to 2 wt.-%, most preferably 0.5 to 1.5 wt.-%, based on the content of the monomers used in preparing polymer B2.

The emulsifier, the initiator PI-2 and the polymerization auxiliaries may each be charged on their own or in a mixture to the graft substrate polymer B1. Any of the possible combinations of, on the one hand, charging and feeding and, on the other hand, initiator, emulsifier and polymerization auxiliaries may be used. Preferred embodiments are those known to the skilled worker.

According to the invention, in step (ii) of the process monomer B21 and, if present, comonomer B22 are fed (dosed) to the reaction mixture within 7 to 20 hours, preferably 8 to 18 hours, more preferably 9 to 15 hours at a temperature of from 50 to 100° C., preferably 55 to 70° C. In step (ii) optionally the initiator PI-2 can also be fed (dosed) to the reaction mixture within said time range.

Preferably the initiator is added in one portion at the beginning of step (ii).

Monomers B21 and B22 (which in polymerized form constitute polymer B2) to be grafted from the active sites (=second double bond of the bifunctional, crosslinking monomer B12) of graft substrate polymer B1 are added continuously to the reaction mixture during the polymerization.

The graft polymerization step (ii) of the process according to the invention is usually conducted within 7 to 20 hours at a temperature of from 50 to 100° C., preferably 55 to 70° C.

If run in emulsion, the solid content of graft copolymer B is between 30 and 50 wt.-%.

Alternatively, after isolation of the product obtained in step (i) in a known manner such as precipitation and drying, step (ii) of the process of the invention can be conducted by solution polymerization in an organic solvent such as toluene using an oil soluble initiator PI-2 such as benzoyl peroxide (BPO) or azobisisobutyronitrile (AIBN). The amount of said oil-soluble initiator Pi-2 is also in the range as defined for initiator PI-2 above. In case of a solution polymerization step (ii) is also conducted at a temperature and time range as defined above.

If run in solution, the solid content of graft copolymer B is between 15 and 50 wt.-%.

The aqueous dispersion of the graft polymers B—obtained by emulsion polymerization step ii)—is worked up in a manner known per se. Customarily, first of all, the graft polymer b is precipitated in the dispersion, by addition of precipitating salt solutions (such as calcium chloride, magnesium sulfate, alum) or acids (such as acetic acid, hydrochloric acid or sulfuric acid), for example, or else by shear precipitation or freezing (freeze coagulation). The aqueous phase can be removed in a customary way, for instance by sieving, filtering, decanting or centrifuging. This prior separation of the dispersion water produces water-moist graft copolymers B having a residual water content of up to 60 wt %, based on B, in which case the residual water, for example, may adhere externally to the graft copolymer B and may also be included within it.

The graft polymer B can subsequently, as and when required, be dried further in a known way, for example, using hot air or by means of a pneumatic dryer. It is also possible to work up the dispersion by spray drying.

In case that grafting step ii) has been conducted as solution polymerization the polymer can be isolated from the solution in manner known to a skilled person. For example the solvent can be removed by an evaporation extruder or the polymer B can be precipitated, e.g. with methanol, and filtered off. After isolating polymer B it might be dried in an oven (between 50 and 80° C.) with or without vacuum.

The inventive process does not require any special polymerization techniques (such as controlled radical or anionic polymerization methods) to obtain a copolymer having a defined micro-structure but rather relies on simple and economically free radical polymerization techniques.

Due to its economically attractive production, graft copolymer B is designed to replace specialty polymer produced by anionic polymerization.

A further subject of the invention is graft copolymer B as described above obtained by the inventive process as hereinbefore described.

Polymer Blends

A further subject of the invention is a molding composition—also referred to as polymer blend—comprising at least one graft copolymer B as described above and at least one thermoplastic polymer A having a glass transition temperature above 25° C., preferably above 50° C., most preferably above 100° C.

Preferably thermoplastic polymer A is at least one polymer selected from the group consisting of: standard polystyrene (GPPS, homopolystyrene), styrene-acrylonitrile copolymers (SAN), α-methylstyrene-acrylonitrile copolymers (AMSAN), styrene-maleic anhydride copolymers (SMSA), styrene-N-phenylmaleimide copolymers (SNPMI), styrene-methyl methacrylate copolymers (SMMA), styrene-acrylonitrile-maleic anhydride copolymers, styrene-acrylonitrile-phenylmaleimide copolymers, α-methylstyrene-acrylonitrile-methyl methacrylate copolymers, α-methylstyrene-acrylonitrile-tert-butyl methacrylate copolymers, styrene-acrylonitrile-tert-butyl methacrylate copolymers, and poly(meth)acrylates (e.g. polymethylmethacrylate (PMMA)). More preferably thermoplastic polymer A is selected from standard polystyrene (GPPS, homopolystyrene), styrene-acrylonitrile copolymers (SAN), α-methylstyrene-acrylonitrile copolymers (AMSAN), styrene-maleic anhydride copolymers (SMSA) or styrene-methyl methacrylate copolymers (SMMA). In particular preferred are GPPS, SAN and/or SMMA.

The weight average molar mass Mw of the thermoplastic polymer A is in the range of 150,000 to 360 000 g/mol, determined by GPC (solvent: tetrahydrofuran, polystyrene as polymer standard) with UV detection.

Suitable standard polystyrene is produced by the method of anionic or radical polymerization. The nonuniformity of the polymer, which can be influenced by the polymerization process, is of minor importance here. Preference is given to standard polystyrene whose toluene-soluble fraction has an average molecular weight Mw of 150,000 to 300 000 g/mol, more preferably 150,000 to 270 000 g/mol, and which is optionally further furnished with additives, such as, for example, mineral oil (e.g., white oil), stabilizer, antistats, flame retardants or waxes.

SAN copolymers and α-methylstyrene-acrylonitrile copolymers (AMSAN) used as polymer A in accordance with the invention contain generally 18 to 35 wt %, preferably 20 to 32 wt %, more preferably 22 to 30 wt % of acrylonitrile (AN), and 82 to 65 wt %, preferably 80 to 68 wt %, more preferably 78 to 70 wt % of styrene (S) or α-methylstyrene (AMS), where the sum of styrene or α-methylstyrene and acrylonitrile makes 100 wt %.

The SAN and AMSAN copolymers used generally have an average molar mass Mw of 150,000 to 350 000 g/mol, preferably 150,000 to 300 000 g/mol, more preferably 150,000 to 250 000 g/mol, and very preferably 150,000 to 200 000 g/mol.

Suitable SAN copolymers are commercial SAN copolymers such as Luran® from Ineos Styrolution (Frankfurt) for example.

SMMA copolymers used as polymer A in accordance with the invention contain generally 18 to 50 wt %, preferably 20 to 30 wt %, of methyl methacrylate (MMA), and 50 to 82 wt %, preferably 80 to 70 wt %, of styrene, where the sum of styrene and MMA makes 100 wt %.

SMSA copolymers used as polymer A in accordance with the invention contain generally 10 to 40 wt %, preferably 20 to 30 wt %, of maleic anhydride (MAN), and 60 to 90 wt %, preferably 80 to 70 wt %, of styrene, where the sum of styrene and MAN, makes 100 wt %.

Mentioned in particular as poly(meth)acrylates may be polymethyl methacrylate (PMMA) and also copolymers based on methyl methacrylate with up to 40 wt % of further copolymerizable monomers, of the kind available, for example, under the designations Lucryl® from Lucite or Plexiglas® from Evonik (Germany).

The polymers A are obtained in a known way by bulk, solution, suspension, precipitation or emulsion polymerization, with bulk and solution polymerization being preferred. Details of these processes are described for example in Kunststoffhandbuch, edited by R. Vieweg and G. Daumiller, volume 4 "Polystyrol", Carl-Hanser-Verlag Munich 1996, p. 104 ff, and also in "Modern Styrenic Polymers: Polystyrenes and Styrenic Copolymers" (Eds., J. Scheirs, D. Priddy, Wiley, Chichester, UK, (2003), pages 27 to 29) and in GB-A 1472195.

In said polymer blends polymer A functions as a hard matrix polymer and graft copolymer B is used as a modifier, enhancing the properties (impact resistance, transparency, weatherability, mechanical strength) of said hard matrix polymers.

Due to the small domain size of the graft copolymers B even the combination with a polymer A with a different refractive index yields a transparent blend. In contrast to prior art materials there is no need for a refractive index matching between the two components.

Furthermore, the inventive polymer blend may optionally comprise additives and/or auxiliaries C. The amount of the additives and/or auxiliaries C is generally 0 to 10 wt.-%, preferably 0.1 to 5 wt.-%, more preferably 0.2 to 2 wt.-%, based on the overall molding composition comprising (or consisting of) components B, A and C. If additives and/or auxiliaries C are present in the molding composition, their minimum fraction is customarily 0.1 wt %.

The sum of the components A and B and optionally C present in the inventive polymer blend makes 100 wt %.

Preferably the inventive molding composition comprises (or consists of):

5 to 60 wt.-%, preferably 10 to 55 wt.-%, more preferably 10 to 55 wt.-% of at least one graft copolymer B, 30 to 95 wt.-%, preferably 40 to 89.9 wt.-%, more preferably 43 to 89.8 wt.-% of at least one thermoplastic polymer A, and 0 to 10 wt.-%, preferably 0.1 to 5 wt.-%, more preferably 0.2 to 2 wt.-% of additives and/or auxiliaries C, wherein the sum of the amounts of components A, B and, if present C, makes 100 wt.-%.

Preferred according to the invention is a molding composition (polymer blend) consisting of at least one graft copolymer B and at least one thermoplastic polymer A.

Furthermore preferred according to the invention is a molding composition (polymer blend) consisting of at least one graft copolymer B, at least one thermoplastic polymer A and additives and/or auxiliaries C.

The molding composition of the invention may optionally comprise commonly known additives and/or auxiliaries C such as stabilizers, oxidation retarders, agents to counter thermal decomposition and decomposition due to ultraviolet light, lubricants and mold release agents, colorants such as dyes and pigments, fibrous and pulverulent fillers and reinforcing agents, nucleating agents, plasticizers, etc . . . . The fraction thereof being in general not more than 10 wt.-%, preferably not more than 5 wt.-%, more preferably not more than 2 wt.-%. In general—within the afore-mentioned ranges—the amounts of said additives and/or auxiliaries C are chosen such that a certain translucency will be retained.

Examples of oxidation retarders and heat stabilizers are halides of the metals from group I of the periodic table, examples being sodium, potassium and/or lithium halides, optionally in combination with copper(I) halides, e.g., chlorides, bromides, iodides, sterically hindered phenols, hydroquinones, different substituted representatives of these groups, and mixtures thereof, in concentrations of up to 1 wt.-%, based on the weight of the thermoplastic molding composition.

UV stabilizers, used generally in amounts of up to 2 wt.-%, based on the molding composition, include various substituted resorcinols, salicylates, benzotriazoles, and benzophenones.

Furthermore, organic dyes may be added, such as nigrosine, pigments such as titanium dioxide, phthalocyanines, ultramarine blue, and carbon black as colorants, and also fibrous and pulverulent fillers and reinforcing agents. Examples of the latter are carbon fibers, glass fibers, amorphous silica, calcium silicate (wollastonite), aluminum silicate, magnesium carbonate, kaolin, chalk, powdered quartz, mica, and feldspar. The fraction of such fillers and colorants is generally up to 10 wt.-%, preferably up to 5 wt.-%.

Examples of nucleating agents that can be used are talc, calcium chloride, sodium phenylphosphinate, aluminum oxide, silicon dioxide, and nylon 22.

Examples of lubricants and mold release agents, which can be used in general in amounts up to 1 wt.-%, are long-chain fatty acids such as stearic acid or behenic acid, their salts (e.g., Ca or Zn stearate) or esters (e.g., stearyl stearate or pentaerythrityl tetrastearate), and also amide derivatives (e.g., ethylenebisstearylamide). For better processing, mineral-based antiblocking agents may be added in amounts up to 0.1 wt.-% to the molding compositions of the invention. Examples include amorphous or crystalline silica, calcium carbonate, or aluminum silicate.

Processing aids which can be used are, for example, mineral oil, preferably medical white oil, in amounts up to 5 wt.-%, preferably up to 2 wt.-%.

Examples of plasticizers include dioctyl phthalate, dibenzyl phthalate, butyl benzyl phthalate, hydrocarbon oils, N-(n-butyl)benzenesulfonamide, and o- and p-tolylethylsulfonamide.

For further improving the resistance to inflammation, it is possible to add all of the flame retardants known for the thermoplastics in question, more particularly those flame retardants based on phosphorus compounds and/or on red phosphorus itself.

The polymer blends of the invention may be produced from components A and B (and optionally further additives and/or auxiliaries C) by all known methods.

The graft polymers B are prepared by free radical polymerization, as already described above. The obtained graft copolymers B may either—preferably in case that grafting step (ii) has been conducted as solution polymerization—be mixed directly with components A and/or C, or it may be worked up beforehand. The latter approach is preferred.

The graft copolymers B are mixed with the polymer A and, where present, with the further components C in a mixing apparatus, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. Components A and B, and—where included—C may be mixed, for example, by joint extrusion, kneading, or rolling, the aforementioned components necessarily having been isolated from the aqueous dispersion or from the solution obtained in the polymerization. Where one or more components in the form of an aqueous dispersion or of a nonaqueous solution are mixed in, the water and/or the solvent is removed from the mixing apparatus, preferably an extruder, via a degassing unit.

Examples of mixing apparatus for implementing the method includes discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder. Particularly suitable for melt extrusion are, for example, single-screw or twin-screw extruders. A twin-screw extruder is preferred.

In some cases the mechanical energy introduced by the mixing apparatus in the course of mixing is enough to cause the mixture to melt, meaning that the mixing apparatus does not have to be heated. Otherwise, the mixing apparatus is generally heated. The temperature is guided by the chemical and physical properties of components A and B and—when present—C, and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 160 to 400° C., preferably 180 to 300° C.

In one preferred embodiment, the mixing of the aforementioned components takes place in an extruder, with the graft copolymer B being separated beforehand from the dispersion water. As a result of this prior removal of the dispersion water, water-moist graft copolymers B are obtained which have a residual water content of up to 60 wt.-%, based on B. The residual water present may then be removed in vapor form as described above via degassing facilities in the extruder. With particular preference, however, the residual water in the extruder is not removed solely as steam; instead, a part of the residual water is removed mechanically in the extruder and leaves the extruder in the liquid phase. In the case of this so-called squeeze method (EP-B 0 993 476, pp. 13-16), the same extruder is supplied with the polymer A and—where present—components C, meaning that the product of the method extruded is the completed polymer blend.

However, the components of the polymer blend of the present invention may also be dry-blended, for example in a tumble blender. Said dry-blended polymer blends can be used directly in a process for the production of shaped articles, e.g. by extrusion, injection molding or blow molding.

Further said polymer blends can be extruded and the extruded molding composition can be used in a process for the production of shaped articles, e.g. by extrusion, injection molding or blow molding.

The molding composition of the present invention can be used for the production of shaped articles or moldings, e.g. foils.

Furthermore, the present invention relates to a molding or shaped article comprising (or made of) a molding composition as described above. The molding or shaped article can be used in various fields of applications of transparent, in particular highly transparent, polymer articles. The moldings or shaped articles can be e.g. a food container, display racks, crisper trays, and components of toys.

Furthermore, the present invention relates to the use of a molding composition as described above for the production of household items, electronic components, household equipment, garden equipment, medical-technology equipment, motor-vehicle components, and bodywork parts. In particular the polymer blend as described above can be used for the production of a food container. In particular the polymer blend as described above can be used for the production of highly transparent objects (e.g. foils).

The following examples and claims further illustrate the invention.

EXAMPLES

Materials

THF, and methanol, are supplied by VWR chemicals as chromatography grades and are used without any further purification. Aluminum oxide (activated, basic, Brockmann Grade I, 58 angstroms) was purchased from Alfa Aesar and was used as received. The monomer inhibitor is removed from the used monomers by adsorptive filtration using an aluminum oxide column.

Methods for Characterization

SEC analysis is performed with an Agilent 1100 Series HPLC system, equipped with UV (254 nm) detector and RI detector (Agilent 1100 series). The following column set from Agilent is used: PL gel 5 μm guard column (50×7.5 mm), 2 PL gel 5 μm Mixed-C columns (300×7.5 mm). The analysis is performed using THF as solvent for the sample dissolution as well as for elution solvent. The samples are dissolved at 1 mg/mL concentration and the flow rate is fixed at 1 mL/min. A polystyrene standard set from Polymer Standard Service PSS is used for calibration.

HPLC analysis is performed with an Agilent 1100 Series HPLC system, using a Nucleosil 100-5 OH (250×4.6 mm) column. An evaporative light scattering detector PL-ELS 2100 from Agilent is used.

1H NMR analysis is recorded on a Bruker advance 300 NMR spectrometer (frequency at 300.38 MHz) in CDCl$_3$ at 298.1 K. Chemical shifts are reported in δ units (ppm) relative to the remaining resonances of the solvent at 7.26 ppm.

NMR analysis is used to determine the hard phase content in the graft copolymer B by integration of the corresponding hard and soft phase peaks.

The molar percentage of hard phase is calculated as follows.

$$\text{mol. \%}_{hard\ phase} = \frac{Int_{(hard\ phase\ peak)}}{\frac{Int_{(soft\ phase\ peak)}}{member\ H} + \frac{Int_{(hard\ phase\ peak)}}{member\ H}}$$

$$\text{wt. \%}_{hard\ phase} = \frac{\frac{\text{mol. \%}_{hard\ phase}}{M_{hard\ phase}}}{\frac{1 - \text{mol. \%}_{hard\ phase}}{M_{soft\ phase}} + \frac{\text{mol. \%}_{hard\ phase}}{M_{soft\ phase}}}$$

The analysis is used to quantify the number of olefinic groups remaining on the grafted backbone after graft copolymerization. The grafting yield can therefore be defined as:

$$\eta(\text{grafting}) = \frac{\text{mol. \% of olefinic after grafting}}{\text{mol. \% of olefinic before grafting}}$$

Film casting from solvent: The dried graft copolymer B is dissolved in toluene (3 wt. % solution). The solution is cast in a petri dish and the solvent is allowed to evaporate at room temperature for minimum 24 h. The film is removed from the petri dish by dipping. Then, the film is dried in a vacuum oven for a minimum of 24 h. The films are used for mechanical testing, optical measurements and TEM analysis.

Mechanical properties Tensile strength, elongation and E-modulus of the samples are measured using a Zwick Roell Z 2.5 device.

Optical properties: Transmittance, clarity and haze coefficients are determined by using a Gardner Haze hard plus. The transmission is determined according to ASTM D1003 and the haze is determined according to ASTM D1003-95.

TABLE 1

Preparation of Graft Copolymer B

| Examples | Polymer | Type | step (ii) monomer dosing time (h) | graft substrate polymer B1 used from example |
|---|---|---|---|---|
| 1 | PBA-co-DCPA | graft substrate polymer B1 synthesis, step (i) | — | — |
| 2 | PBA-co-AMA | graft substrate polymer B1 synthesis, step (i) | — | — |
| 3 | PBA-co-DCPA-g-PS | Grafting copolymerization, step (ii) | 10 | 1 |
| 4 | PBA-co-AMA-g-PS | Grafting copolymerization, step (ii) | 10 | 2 |

Example 1: Emulsion Polymerization of Polybutylacrylate-Co-DCPA (2 wt.-% DCPA)

The reaction vessel is charged with 151.52 g of demineralized water, 1.525 g of a 40 wt.-% sodium alkylsulfonate (C14 to C18) solution in water and 0.23 g sodium bicarbonate and subsequently evacuated and purge with nitrogen. After heating the reaction vessel to 59° C., 0.18 g potassium persulfate is added to the reaction mixture. A mixture of 2.04 g DCPA (dihydrodicyclopentadienyl acrylate) and 100 g butyl acrylate is added within 210 min under constant stirring. After 30 min, 90 min and 150 min a portion of each 0.33 g tert-Dodecylmercaptan is added. The post polymerization time is 60 min at a temperature of 61° C. For the preparation a scaling factor of 35.6 was used.

An average particle diameter of 80 nm was determined by turbidity for the latex particles. The gel content in toluene is below 2 wt.-%.

An aqueous solution containing 1 wt. % of MgSO$_4$ and 0.06 wt. % of H$_2$SO$_4$ was prepared and heated up to 50° C. The prepared latex was poured in a minimum of 5 folds of the aqueous acidic solution, heated up to 90° C. to coagulate. The polymer was then filtered and dried in a vacuum oven for 24 hours at 50° C.

Example 2: Emulsion Polymerization of Polybutylacrylate-Co-Allylmethacrylate (2.39 wt.-% AMA)

The reaction vessel is charged with 151.52 g of demineralized water, 1.525 g of a 40 wt.-% sodium alkylsulfonate (C14 to C18) solution in water and 0.23 g sodium bicarbonate and subsequently evacuated and purge with nitrogen. After heating the reaction vessel to 59° C., 0.18 g potassium persulfate is added to the reaction mixture. A mixture of 2.45 g AMA (allyl methacrylate) and 100 g butyl acrylate is added within 210 min under constant stirring. After 30 min, 90 min and 150 min a portion of each 0.33 g tert-Dodecylmercaptan is added. The post polymerization time is 60 min at a temperature of 61° C. For the preparation a scaling factor of 20 was used. A diameter of 87 nm was determined by turbidity for the latex particles. The Gel content in Toluene is below 1 wt.-%.

An aqueous solution containing 1 wt. % of MgSO$_4$ and 0.06 wt. % of H$_2$SO$_4$ was prepared and heated up to 50° C. The prepared latex was poured in a minimum of 5 folds of the aqueous acidic solution, heated up to 90° C. to coagulate. The polymer was then filtered and dried in a vacuum oven for 24 hours at 50° C.

Example 3: Grafting of Styrene from Polybutylacrylate-Co-DCPA 80 g of the emulsion from example 1 (31.44 g of PBA-co-DCPA) is charged in a 500 mL reactor equipped with an impeller stirrer. A solution of water (187.24 g) with sodium dodecyl sulfate (0.75 g) and $NaHCO_3$ (0.088 g) is added to the mixture and stirred at room temperature at 200 rpm. The mixture is heated up to 60° C. and potassium persulfate is added to the mixture (0.5 g). 125.76 g of Styrene is added to the mixture in the course of 10 hours, after which the mixture is kept at 60° C. for 10 more hours.

The produced emulsion is mixed with 500 mL of deionized water under stirring. 50 mL of a 20 wt.-% aqueous solution of $Mg_2SO_4$ is added to the mixture for precipitation. The polymer is isolated by filtration and washed with water. The product is then dried in a convection oven for 24 hours at 60° C. and in a vacuum oven at 60° C. for a further 24 hours.

Example 4: Grafting of Styrene from Polybutylacrylate-Co-AMA 80 g of the emulsion from example 2 (31.44 g of PBA-co-AMA) is charged in a 500 mL reactor equipped with an impeller stirrer. A solution of water (187.24 g) with sodium dodecyl sulfate (0.75 g) and $NaHCO_3$ (0.088 g) is added to the mixture and stirred at room temperature at 200 rpm. The mixture is heated up to 60° C. and potassium persulfate is added to the mixture (0.5 g). 125.76 g of Styrene is added to the mixture in the course of 10 hours, after which the mixture is kept at 60° C. for 10 more hours.

The produced emulsion is mixed with 500 mL of deionized water under stirring. 50 mL of a 20 wt.-% aqueous solution of $Mg_2SO_4$ is added to the mixture for precipitation. The polymer is isolated by filtration and washed with water. The product is then dried in a convection oven for 24 hours at 60° C. and in a vacuum oven at 60° C. for a further 24 hours.

Example 5

A molding composition is prepared from 50% by weight of the polymer from example 1 and 50% by weight of commercial SAN-copolymer (Luran®).

The invention claimed is:

1. A graft copolymer B, built up from:
   (B1) 15 to 45 wt.-%, based on graft copolymer B, of a non-cross-linked graft substrate polymer B1 having a glass transition temperature $T_G$ below 25° C. (DSC, heating rate: 5K/min), consisting of polymerized units derived from monomers B11, B12, and optionally B13:
   (B11) from 95 to 99.5 wt.-%, based on the total weight of B11, B12, and B13, of at least one $C_1$-$C_i{_8}$-alkyl acrylate;
   (B12) from 0.5 to 5 wt.-%, based on the total weight of B11, B12, and B13, of at least one bifunctional, crosslinking monomer which contains two copolymerizable double bonds which are not conjugated in 1,3 positions; and
   (B13) from 0 to 4.5 wt.-%, based on the total weight of B11, B12, and B13, of at least one other copolymerizable, monoethylenically unsaturated monomer; and
   (B2) 55 to 85 wt.-%, based on graft copolymer B, of at least one polymer B2 having a glass transition temperature $T_G$ above 25° C., grafted from the graft substrate polymer (B1), consisting of polymerized units derived from monomers B21 and optional comonomers B22:
   (B21) from 65 to 100 wt.-% of at least one vinylaromatic monomer or its mixture with at least one $C_1$-$C_8$-alkyl-(meth)acrylate; and
   (B22) from 0 to 35 wt.-% of at least one other monofunctional comonomer;
   where components B1 and B2 give 100 wt.-% in total, and wherein
   the graft substrate polymer B1 has a gel content (non-soluble fraction in toluene) below 5 wt.-%, based on the total amount of B1; and
   the second double bond of the bifunctional, crosslinking monomer B12 is the active site from which polymerized units derived from monomer B21 and optionally comonomer B22 are grafted.

2. The graft copolymer B according to claim 1 having a transmittance T of at least 75% (determined according to ASTM D1003) and a haze coefficient below 10% (determined according to ASTM D1003-95).

3. The graft copolymer B according to claim 1, wherein monomer B11 is ethyl acrylate, 2-ethylhexyl acrylate, n-butyl acrylate, or mixtures thereof.

4. The graft copolymer B according to claim 1, wherein the bifunctional, crosslinking monomer B12 is allyl methacrylate (AMA) or dicyclo-pentadienyl acrylate (DCPA).

5. The graft copolymer B to claim 1, wherein monomer B21 is styrene, α-methylstyrene, or a mixture of styrene or a-methylstyrene with methyl methacrylate.

6. The graft copolymer B according to claim 1, wherein comonomer B22 is maleic anhydride or acrylonitrile.

7. The graft copolymer B according to claim 1, wherein polymer B2 has been built up from styrene, or from a mixture consisting of 65 to 85 wt.-% styrene and 15 to 35 wt.-% acrylonitrile, maleic anhydride, or methyl methacrylate.

8. The graft copolymer B according to claim 1, wherein monomer B13 is not present.

9. The graft copolymer B according to claim 1, built up from:
   (B1) 20 to 40 wt.-% of graft substrate polymer B1 and
   (B2) 60 to 80 wt.-% of polymer B2.

10. A process for the preparation of the graft copolymer B according to claim 1, which comprises the following steps:
    (i) free radical aqueous emulsion polymerization of monomers B11, B12, and optionally B13 in presence of an initiator PI-1; and
    (ii) grafting monomer B21 and optional comonomer B22 from graft substrate polymer B1 obtained in step (i) by free radical emulsion or solution polymerization in presence of an initiator PI-2;
    where the initiators PI-1 and PI-2 can be the same or different compounds, and
    wherein
    step i) is performed in presence of 0.85 to 2 wt.-% of at least one chain transfer agent, based on the total amount of monomers B11, B12, and B13; and
    in step ii):
    the amount of the initiator PI-2 is 0.1 to 3 wt.-%, preferably 0.5 to 2 wt. %, relative to the total content of monomers B21 and B22; and
    monomer B21 and, if present, comonomer B22 are fed continuously to the reaction mixture over 7 to 20 hours at a temperature of from 50 to 100° C.

11. The process according to claim 10, wherein in step i) the chain transfer agent is added stepwise in two or more portions.

12. The process according to claim 10, wherein in step ii) the monomer, and optional initiator, feed is within 9 to 15 hours.

13. A graft copolymer B obtained by the process according to claim 10.

14. A molding composition comprising at least one graft copolymer B according to claim 1, and optionally additives and/or auxiliaries C.

15. The molding composition according to claim 14, further comprising at least one thermoplastic polymer A having a glass transition temperature above 25° C.

16. The molding composition according to claim 15, wherein the thermoplastic polymer A is selected from standard polystyrene (GPPS, homopolystyrene), styrene-acrylonitrile copolymers (SAN), a-methylstyrene-acrylonitrile copolymers (AMSAN), styrene-maleic anhydride copolymers (SMSA), and styrene-methyl methacrylate copolymers (SMMA).

17. The molding composition according to claim 15, comprising:
    5 to 60 wt.-% of at least one graft copolymer B,
    30 to 95 wt.-% of at least one thermoplastic polymer A, and
    0 to 10 wt.-% of additives and/or auxiliaries C,
    wherein the sum of the amounts of components A, B, and, if present, C, makes 100 wt.-%.

18. A shaped article comprising the molding composition according to claim 14.

19. The molding composition according to claim 14 for the production of a household item, an electronic component, household equipment, garden equipment, medical-technology equipment, a motor-vehicle component, and a bodywork part.

* * * * *